(12) United States Patent
Reevell

(10) Patent No.: US 11,602,019 B2
(45) Date of Patent: Mar. 7, 2023

(54) CARTRIDGE WITH A CAPACITY SENSOR

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 731 days.

(21) Appl. No.: 15/264,881

(22) Filed: Sep. 14, 2016

(65) Prior Publication Data

US 2017/0071253 A1 Mar. 16, 2017

Related U.S. Application Data

(63) Continuation of application No. PCT/EP2016/070240, filed on Aug. 26, 2016.

(30) Foreign Application Priority Data

Sep. 16, 2015 (EP) .................................. 15185562

(51) Int. Cl.
*A24F 40/00* (2020.01)
*H05B 3/44* (2006.01)
(Continued)

(52) U.S. Cl.
CPC ............ *H05B 3/44* (2013.01); *A24F 40/42* (2020.01); *A24F 40/51* (2020.01); *G01F 17/00* (2013.01);
(Continued)

(58) Field of Classification Search
CPC ...... A24F 47/008; G01F 17/00; G01F 23/268; G01N 27/22; H05B 1/0244; H05B 3/44;
(Continued)

(56) References Cited

U.S. PATENT DOCUMENTS 5,635,962 A * 6/1997 Goldis ................ B41J 2/17566
347/7
10,736,357 B2 * 8/2020 Hon ...................... A61M 15/06
(Continued)

FOREIGN PATENT DOCUMENTS

CN 2611879 Y 4/2004
CN 101978244 A 2/2011
(Continued)

OTHER PUBLICATIONS

"What is Capillary Action". Peshin, Akash.ScienceABC.2019. retrieved on Jul. 18, 2020 from https://www.scienceabc.com/nature/what-is-capillary-action.html (Year: 2019).*
(Continued)

*Primary Examiner* — Helena Kosanovic
*Assistant Examiner* — Lawrence H Samuels
(74) *Attorney, Agent, or Firm* — Harness, Dickey & Pierce, P.L.C.

(57) ABSTRACT

A cartridge for an aerosol-generating system includes a sensor including a capacitor with a first capacitor plate and a second capacitor plate, a storage portion for storing an aerosol-forming substrate, and a vaporizer. The storage portion is between the first capacitor plate and the second capacitor plate. The permittivity of the liquid storage portion changes upon a change of the volume f the liquid aerosol-forming substrate held in the liquid storage portion. The sensor is configured to measure the capacitance of the capacitor. The measured capacitance relates to a corresponding permittivity of the aerosol-forming substrate held in the storage portion so that the amount of the volume of the aerosol-forming substrate held in the storage portion is determinable from the measured capacitance.

14 Claims, 10 Drawing Sheets

(51) Int. Cl.
  *H05B 1/02* (2006.01)
  *G01F 17/00* (2006.01)
  *A24F 40/42* (2020.01)
  *A24F 40/51* (2020.01)
  *G01N 27/22* (2006.01)
  *G01F 23/263* (2022.01)
  *A24F 40/10* (2020.01)

(52) U.S. Cl.
  CPC .......... *H05B 1/0244* (2013.01); *A24F 40/10* (2020.01); *G01F 23/268* (2013.01); *G01N 27/22* (2013.01); *H05B 2203/014* (2013.01); *H05B 2203/021* (2013.01); *H05B 2203/022* (2013.01)

(58) Field of Classification Search
  CPC ........ H05B 2203/014; H05B 2203/021; H05B 2203/022
  See application file for complete search history.

(56) References Cited

U.S. PATENT DOCUMENTS

| | | | |
|---|---|---|---|
| 2005/0007239 | A1 | 1/2005 | Woodard et al. |
| 2011/0036346 | A1 | 2/2011 | Cohen et al. |
| 2012/0291791 | A1 | 11/2012 | Pradeep |
| 2013/0104916 | A1 | 5/2013 | Bellinger et al. |
| 2013/0192623 | A1* | 8/2013 | Tucker .............. H01C 17/00 131/329 |
| 2013/0213419 | A1* | 8/2013 | Tucker .............. H05B 3/34 131/328 |
| 2014/0096781 | A1* | 4/2014 | Sears .............. A24F 47/008 131/328 |
| 2014/0229137 | A1 | 8/2014 | Rusnack et al. |
| 2014/0261487 | A1* | 9/2014 | Chapman .............. A24F 40/70 87/6 |
| 2014/0283855 | A1* | 9/2014 | Hawes .............. A24F 47/008 131/328 |
| 2014/0305450 | A1 | 10/2014 | Xiang |
| 2014/0338685 | A1 | 11/2014 | Amir |
| 2015/0122015 | A1 | 5/2015 | Leppard |
| 2015/0245654 | A1* | 9/2015 | Memari .............. A24F 15/12 141/2 |
| 2016/0213066 | A1* | 7/2016 | Zitzke .............. A24F 47/008 |
| 2016/0345628 | A1* | 12/2016 | Sabet .............. A24F 15/18 |
| 2017/0071253 | A1* | 3/2017 | Revell .............. A24F 40/42 |
| 2017/0340009 | A1* | 11/2017 | Hon .............. A24F 40/50 |

FOREIGN PATENT DOCUMENTS

| | | |
|---|---|---|
| CN | 102042859 A | 5/2011 |
| CN | 102538906 A | 7/2012 |
| CN | 104535135 A | 4/2015 |
| EP | 0028399 A2 | 5/1981 |
| EP | 2257195 A1 | 12/2010 |
| EP | 2468118 A1 | 6/2012 |
| EP | 2471392 A1 | 7/2012 |
| GB | 1071656 A | 6/1967 |
| JP | 2014-501106 A | 1/2014 |
| WO | WO-2008077271 A1 | 7/2008 |
| WO | WO-2009118085 A1 | 10/2009 |
| WO | WO-2009127401 A1 | 10/2009 |
| WO | WO-2011137453 A2 | 11/2011 |
| WO | WO-2011146329 A2 | 11/2011 |
| WO | WO-2012027350 A2 | 3/2012 |
| WO | WO-201272790 A1 | 6/2012 |
| WO | WO-2012085203 A1 | 6/2012 |
| WO | WO-2012085207 A1 | 6/2012 |
| WO | WO-2013060781 A1 | 5/2013 |
| WO | WO-2013060784 A2 | 5/2013 |
| WO | WO-2013098398 A2 | 7/2013 |
| WO | WO-2014040988 A2 | 3/2014 |
| WO | WO-2014/058678 A1 | 4/2014 |
| WO | WO-2014/150247 A1 | 9/2014 |
| WO | WO-2014138244 A1 | 9/2014 |
| WO | WO-2014150247 A1 | 9/2014 |
| WO | WO-2014166037 A1 | 10/2014 |
| WO | WO-2014166121 A1 | 10/2014 |
| WO | WO-2015/117703 A1 | 8/2015 |
| WO | WO-2015127429 A1 | 8/2015 |
| WO | WO-2016101202 A1 | 6/2016 |

OTHER PUBLICATIONS

International Search Report for corresponding Application No. PCT/EP2016/070240 dated Dec. 7, 2016.
European Search Report for corresponding Application No. 15185562.4 dated Mar. 31, 2016.
Russian Notice of Allowance for corresponding Application No. 2018110108, dated Aug. 30, 2019, English translation thereof.
Chinese Office Action for corresponding Application No. 201680051440.7, dated May 7, 2020.
Japanese Office Action dated Oct. 19, 2020, for corresponding Japanese Application No. P2018-514314, and English-language translation thereof.
Japanese Notice of Allowance dated Feb. 1, 2021 for corresponding Japanese Application No. 2018-514314, and English-language translation thereof.

* cited by examiner

CARTRIDGE WITH A CAPACITY SENSOR

This is a continuation of and claims priority to PCT/EP2016/070240 filed on Aug. 26, 2016, and further claims priority to EP 15185562.4 filed on Sep. 16, 2015; both of which are hereby incorporated by reference in their entirety.

BACKGROUND

At least one example embodiment relates to aerosol-generating systems, such as handheld electrically operated vaping systems. At least one example embodiment relates to liquid storage portions used in aerosol-generating systems in which the aerosol-forming substrate is liquid and is contained in the liquid storage portion.

One type of aerosol-generating system is an electrically operated vaping system. Handheld electrically operated vaping systems may consist of a device portion comprising a battery and control electronics, a cartridge portion comprising a supply of aerosol-forming substrate held in a liquid storage portion, and an electrically operated vaporizer. A cartridge comprising both a supply of aerosol-forming substrate held in the liquid storage portion and a vaporizer is sometimes referred to as a "cartomizer". The vaporizer typically comprises a coil of heater wire wound around an elongate wick soaked in the liquid aerosol-forming substrate held in the liquid storage portion. The cartridge portion typically comprises not only the supply of aerosol-forming substrate and an electrically operated vaporizer, but also a mouthpiece, which the vaper draws on in use to draw aerosol.

It would be desirable to provide an aerosol-generating system that senses the consumption of aerosol-forming substrate and that determines the amount of aerosol-forming substrate remaining in the liquid storage portion.

WO 2012/085207 A1 discloses an electrically operated aerosol-generating system for receiving an aerosol-forming substrate. The system comprises a liquid storage portion for storing liquid aerosol-forming substrate, an electric heater comprising at least one heating element for heating the liquid aerosol-forming substrate, and electric circuitry configured to monitor activation of the electric heater and estimate an amount of liquid aerosol-forming substrate remaining in the liquid storage portion based on the monitored activation. The monitored activation of the electric heater, e.g. by counting the number of activations, the activation time, even under consideration of power and temperature, are only rough estimates of the amount of the remaining liquid.

It would be desirable to provide an aerosol-generating system that improves the precision of the determined volume of the remaining liquid. It would be further desirable to provide an aerosol-generating system that is capable of determining the volume f the remaining liquid that does not require calculation of the volume of liquid consumed so far.

SUMMARY

According to at least one example embodiment a cartridge for an aerosol-generating system comprises a sensor. The sensor comprises a capacitor with a first capacitor plate and a second capacitor plate. The cartridge also comprises a liquid storage portion configured to hold a liquid aerosol-forming substrate and a vaporizer. The liquid storage portion is between the first capacitor plate and the second capacitor plate. The permittivity of the liquid storage portion changes upon a change of the volume of the liquid aerosol-forming substrate held in the liquid storage portion. The sensor is configured to sense a capacitance of the capacitor. The sensed capacitance relates to a corresponding permittivity of the liquid aerosol-forming substrate held in the liquid storage portion so that the amount of the volume of the liquid aerosol-forming substrate held in the liquid storage portion is determinable from the measured capacitance.

At least one example embodiment is related to an aerosol-generating system that comprises the cartridge.

The liquid aerosol-forming substrate held in the liquid storage portion forms part of the dielectric of the capacitor. The liquid storage portion is sealed and comprises an outlet for allowing liquid aerosol-forming substrate to flow from the liquid storage portion to a vaporizer. The cartridge may comprise a housing in which the liquid storage portion is located.

In at least one example embodiment, the cartridge comprises a capillary medium like a wick that draws the liquid aerosol-forming substrate to the vaporizer. In normal operation of an aerosol-generating system comprising the cartridge, the volume of liquid aerosol-forming substrate held in the liquid storage portion may be reduced by drawing the liquid aerosol-forming substrate from the liquid storage portion. The capillary medium may be oriented in the housing.

As liquid aerosol-forming substrate is vaporized and consumed, the amount of liquid aerosol-forming substrate inside the liquid storage portion is reduced. This change in the amount of liquid aerosol-forming substrate changes the dielectric properties of the capacitor and therefore the capacitance reading will change. The capacitance measurement can be used to determine the amount of liquid aerosol-forming substrate held in the liquid storage portion.

The liquid storage portion comprises one or more walls representing a surface of the liquid storage portion under which liquid aerosol-forming substrate may be stored. In at least one example embodiment, the one or more walls of the liquid storage portion are rigid and provide a substantially constant volume even if the amount of liquid aerosol-forming substrate held in the liquid storage portion changes. The liquid storage portion may be an entirely rigid liquid container. One or more walls of the liquid storage portion may be flexible. The one or more flexible walls may adapt: to the volume of the liquid aerosol-forming substrate held in the liquid storage portion (e.g., by flexing). The liquid storage portion may comprise a first wall, a second wall opposite to the first wall, and side walls extending between the first wall and the second wall. In at least one example embodiment, one or more of walls of the liquid storage portion are integrally formed. The liquid storage portion may comprise one or more distinct walls that are attached to each other and that are part of the surface of the liquid storage portion under which liquid aerosol-forming substrate may be stored.

The liquid storage portion may be configured to hold the level of the liquid aerosol-forming substrate essentially perpendicular to the first capacitor plate and to the second capacitor plate. In at least one example embodiment, the liquid storage portion comprises at least one channel configured to hold the liquid aerosol-forming substrate. The at least one channel is configured such that capillary forces act on the liquid aerosol-forming substrate so that the level of the liquid aerosol-forming substrate is held essentially perpendicular to the first capacitor plate and to the second capacitor plate. The internal volume of the liquid storage portion may be formed such that at least one section of the container has a width dimension below a desired (or alternatively predefined) value. This value depends on the materials used for the liquid storage portion as well as on the physical and chemical properties of the liquid aerosol-forming substrate. In some example embodiments, the width dimension is below about 3 millimeters, below about 2 millimeters, below about 0.5 millimeters, or below about 0.25 millimeters. Use of capillary forces represents a simple and reliable method for holding the liquid aerosol-forming substrate in a well-defined and contiguous volume area.

The sensor comprises a signal generating function, a signal altering function that is configured to alter the signal generated by the signal generating function, and a signal detecting function that is configured to detect the signal generated by the signal generating function after being altered by the signal altering function. The signal generating function may be embodied by an alternating-current (AC) voltage source. The capacitor provides the signal altering function. The signal detecting function may be realized by a controller that processes an analog-to-digital (ADC) converted voltage from the capacitor that is connected to the AC voltage source.

The signal detecting function determines the capacitance of the capacitor. The capacitance corresponds to a permittivity of the liquid aerosol-forming substrate held in the liquid storage portion. The permittivity is related to a corresponding volume of the liquid aerosol-forming substrate held in the liquid storage portion. Consequently, the current volume of liquid aerosol-forming substrate held in the liquid storage portion can be determined based on a measured capacitance of the capacitor of the sensor without the need to retrieve historical measurement data to determine the current volume of the liquid storage portion.

The first capacitor plate may be arranged at a first wall of the liquid storage portion. The second capacitor plate may be arranged at a second wall of the liquid storage portion.

In at least one example embodiment, the first wall and the second wall have a generally planar shape and the second wall is opposite to the first wall. The first capacitor plate and the second capacitor plate may have a generally planar shape.

The first wall and the second wall may have a generally cylindrical shape. The second wall is located within the volume defined by the first wall. The first capacitor plate and the second capacitor plate may have a generally cylindrical shape.

The aerosol-generating system may further comprise a tilt sensor that determines whether freely moving liquid aerosol-forming substrate held in the liquid storage portion has a liquid level essentially perpendicular to the first capacitor plate and the second capacitor plate.

The dielectric between the capacitor plates must be an insulator. Liquid aerosol-forming substrate is non-conducting and therefore is a suitable dielectric material. Air is an insulator and also a suitable dielectric material.

The dielectric properties of a material are temperature-dependent. The cartridge may comprise a temperature sensor to consider the effect of temperature.

Different liquid aerosol-forming substrates may have different dielectric properties that result in a different permittivity. Different permittivities between liquid aerosol-forming substrates could be greatly exaggerated, for example by varying the proportions between the main constituents of the liquid aerosol-forming substrate, for example by modifying the proportions between glycerine and propylene glycol. In order to produce cartridges with identifiable different liquid aerosol-forming substrates, the proportions between the constituents of the liquid aerosol-forming substrates may be chosen such that the permittivity of the liquid aerosol-forming substrate has an identifiable difference. In such embodiments, a liquid aerosol-forming substrate is identified by measuring the capacitance of the capacitor. This may only be possible for brand new cartridges unless one of the properties can cause significant capacitance changes.

The liquid aerosol-forming substrate may contain a mixture of dielectric materials, each with a separate dielectric constant (k). The main constituents of a liquid aerosol-forming substrate at room temperature (20° C.) may include: glycerine (k~42), propylene glycol (k~32), water (k~80), air (k~1), nicotine, and flavorants.

The capacitors may have a capacitance in Picofarad (pF) range. While this is a relatively low capacitance, Picofarad capacitors are widely used and considered to be within a conventional range. Picofarad capacitors can be charged and discharged extremely quickly, enabling fast measurements of capacitance to be obtained.

To obtain the dielectric constant of a liquid aerosol-forming substrate, it is assumed that an average dielectric value can be obtained by multiplying the volume fraction of each component by its corresponding dielectric and then summing the determined values.

A liquid aerosol-forming substrate may comprise a 50:50 mix of glycerine, for example vegetable glycerine (VG), and propylene glycol (PG) with 2% nicotine and 2% flavorant content. Thus, neglecting the small nicotine and flavorant content and averaging the dielectric constant for VG (k~42) and PG (k~32) gives k~42×0.5+32×0.5=37 for a liquid aerosol-forming substrate.

Capacitor plates are electrically conducting plates that hold charge. These may be constructed from a wide range of conducting materials including metals and conducting polymers. In at least one example embodiment, the capacitor plates are sufficiently rigid or supported to maintain the capacitor shape. In at least one example embodiment, the capacitor plates are sufficiently non-reactive so as not to react with or contaminate the liquid aerosol-forming substrate. This may be achieved by treatment of the plates to form a protective layer, such as by gold plating or oxidizing.

Capacitance is primarily a function of charge plate separation, charge plate size and dielectric material properties. Thus, to obtain a meaningful result that is due to changes in dielectric properties, the capacitor must be sufficiently rigid and secure so as to maintain plate separation and not to change shape. A capacitor may be formed with solid metal plates or with a thin metal sheet attached to a supporting substrate. The supporting substrate may form part of the capacitor dielectric between plates or may be outside the capacitor plates.

The sensor may comprise a reference capacitor with a constant amount of liquid aerosol-forming substrate between its capacitor plates. The varying liquid level is determined in relation to the reference capacitor. In at least one example embodiment, the reference capacitor is a distinct part of the capacitor that requires a minimum or desired filling level of liquid aerosol-forming substrate so that at least the area of the capacitor corresponding to the reference capacitor is filled with liquid aerosol-forming substrate.

According to at least one example embodiment, a cartridge comprises a rigid liquid storage portion with at least one channel sufficiently narrow that capillary forces act on the liquid aerosol-forming substrate held in the at least one channel.

The two capacitor plates may be planar and substantially parallel to each other. The at least one channel may be arranged substantially parallel to the capacitor plates. When consuming liquid aerosol-forming substrate, the filling level of liquid aerosol-forming substrate in the liquid storage portion is reduced, while the liquid aerosol-forming substrate is drawn towards the wick end. This causes the liquid level to be substantially perpendicular to the capacitor plates under normal operating conditions.

In at least one example embodiment, the liquid aerosol-forming substrate is not: soaked in an absorbent foam material so that only liquid aerosol-forming substrate and air are dielectrics.

The capacitor plates are arranged on the surface of the liquid storage portion with the liquid aerosol-forming substrate in between. The liquid aerosol-forming substrate is a dielectric. As the amount of liquid aerosol-forming substrate held between the capacitor plates is reduced due to consumption, the capacitance changes reflect the consumption of liquid aerosol-forming substrate.

Due to the perpendicular arrangement of the liquid aerosol-forming substrate to the capacitor plates, the capacitor may be divided into a first capacitor and a second capacitor with distinct, areas of the capacitor plates. The first capacitor is arranged to cover a liquid section of the liquid storage portion and the second capacitor is arranged to cover an air section of the liquid storage portion. The liquid section refers to a section of the liquid storage portion entirely filled with liquid aerosol-forming substrate, while the air section refers to the remaining section of the liquid storage portion that has been emptied and is therefore filled with air when using the cartridge under conventional conditions. When reducing the amount of liquid aerosol-forming substrate from the liquid storage portion, the size of the first area, corresponding to the first capacitor is reduced, while the size of the second area corresponding to the second capacitor increases accordingly. The total area covering both the first capacitor and the second capacitor remains constant. The first capacitor covers a first area of the first capacitor plate and a first area of the second capacitor plate opposite to the first area of the first capacitor plate. The second capacitor covers a second area of the first capacitor plate and a second area of the second capacitor plate opposite to the second area of the first capacitor plate. Electrically, the first capacitor and the second capacitor are connected in parallel to each other.

In case of a liquid storage portion arranged between two planar, essentially parallel capacitor plates, the relationship between the capacitance $C_1$, $C_2$ of the capacitor and the size of the corresponding area $A_1$, $A_2$ are shown in the equations below:

$$C_1 = \frac{k_1 \varepsilon_0 A_1}{d} \quad C_2 = \frac{k_2 \varepsilon_0 A_2}{d}$$

$$C = \frac{\varepsilon_0}{d}(k_1 A_1 + k_2 A_2)$$

Parallel Plates $C1$ = capacitance of liquid section
$C2$ = capacitance of air section
$C$ = net capacitance ($C1$ and $C2$ in parallel)
$k1$ = relative permittivity of liquid dielectric
$k2$ = relative permittivity of air dielectric
$\varepsilon_0$ = vacuum permittivity
$A1$ = area of liquid capacitor
$A2$ = area of air capacitor
$d$ = separation The relative permittivities $k_1$, $k_2$ of the liquid aerosol-forming substrate and of air are known, as well as the total area size of each of the capacitor plates and the separation d of the capacitor plates. Thus, the size of the first area $A_1$ and the size of the second area $A_2$ may be determined from the measured capacitance C. The remaining volume of liquid aerosol-forming substrate may be determined by multiplying the size of the first area $A_1$ with the separation d between the two capacitor plates.

Alternatively, the liquid storage portion may be arranged between two capacitor plates that are formed as concentric cylinders. The inner concentric cylinder may have an radius a, while the outer concentric cylinder may have a radius b. The liquid aerosol-forming substrate is held at a radius between a and b. When reducing the amount of liquid aerosol-forming substrate from the liquid storage portion, the length $L_1$ of the liquid section of the first capacitor is reduced, while the length $L_2$ of the air section increases accordingly. The total length remains constant and is the height of the concentric cylinders. The relationship between the capacitance $C_1$, $C_2$ of the capacitor and the length of the corresponding areas $L_1$, $L_2$ are shown in the equations below:

$$C_1 = \frac{2\pi k_1 \varepsilon_0 L_1}{\ln\left[\frac{b}{a}\right]} \quad C_2 = \frac{2\pi k_1 \varepsilon_0 L_2}{\ln\left[\frac{b}{a}\right]}$$

$$C = \frac{2\pi \varepsilon_0}{\ln\left[\frac{b}{a}\right]}(k_1 L_1 + k_2 L_2)$$

Concentric Cylinders $C1$ = capacitance of liquid section
$C2$ = capacitance of air section
$C$ = net capacitance ($C1$ and $C2$ in parallel)
$k1$ = relative permittivity of liquid dielectric
$k2$ = relative permittivity of air dielectric
$\varepsilon_0$ = vacuum permittivity
$L1$ = length of liquid capacitor
$L2$ = length of air capacitor
$d$ = separation The relative permittivities $k_1$, $k_2$ of the liquid aerosol-forming substrate and of air are known, as well as the total length of the capacitor and the radius a, b of the two cylindrical capacitor plates. Thus, the length $L_1$ of the first capacitor corresponding to the liquid section and the length $L_2$ of the second capacitor corresponding to the air section may be determined from the measured capacitance. The remaining volume of liquid aerosol-forming substrate may be determined by multiplying the length $L_1$ of the first area with the cross-sectional area size between the two capacitor plates that contains the liquid aerosol-forming substrate.

In at least one example embodiment, a cartridge comprises a liquid storage portion with a central airflow tube that is surrounded by an absorbent foam material saturated in liquid aerosol-forming substrate. The absorbent foam material may be polypropylene foam or cotton. The foam material has dielectric properties. Alternatively, the airflow is provided at the side of the cartridge. A wick leads from the foam and a coil is positioned around the wick and in the airflow path. As the liquid aerosol-forming substrate is consumed, the saturation of the foam decreases.

Capacitor plates are arranged around the foam with a part of the saturated foam in between acting as a dielectric. As the liquid aerosol-forming substrate is consumed, air having dielectric properties will replace the liquid aerosol-forming substrate. Thus, the total average dielectric is a combination of liquid aerosol-forming substrate, absorbent foam material, and air. The total average dielectric will change as liquid aerosol substrate is consumed. Measuring the capacitance provides a measurement for the total average dielectric and this allows for determination of the amount of liquid aerosol-forming substrate held in the liquid storage portion.

The liquid aerosol-forming substrate held in the liquid storage portion will be subject to gravitational and acceleration forces and this may cause a shift in the liquid aerosol-forming substrate to different locations. However, where the entire liquid storage portion is contained within a capacitor, this shift in liquid aerosol-forming substrate may not affect the total average dielectric since the total dielectric composition remains unchanged.

In case of a liquid storage portion arranged between two planar, essentially parallel capacitor plates, the relationship between the capacitance C of the capacitor and the relative permittivity of the dielectric k are shown in the equation below:

$$C = \frac{k\varepsilon_0 A}{d}$$

Parallel Plates $C$ = capacitance
$k$ = relative permittivity of dielectric
$\varepsilon_0$ = vacuum permittivity
$A$ = area
$d$ = separation The total area size A of each of the capacitor plates and the separation d of the capacitor plates are known. Thus, the current value of the relative permittivity k of the dielectric may be determined from the measured capacitance C. The relative permittivity k of the dielectric allows for calculation of the current proportion of liquid aerosol-forming substrate, foam material, and air between the capacitor plates. As the total volume of the liquid storage portion and the initial proportions are known, the remaining amount of liquid aerosol-forming substrate may be determined from the calculated proportion.

Alternatively, the liquid storage portion may be arranged between two capacitor plates that are formed as concentric cylinders. The inner concentric cylinder may have a radius a, while the outer concentric cylinder may have a radius b. The liquid aerosol-forming substrate is held in absorbent foam material at a radius between a and b that acts as a dielectric for the capacitor. When reducing the amount of liquid aerosol-forming substrate from the liquid storage portion, the relative permittivity k of the dielectric is reduced. The relationship between the capacitance C of the capacitor and the relative permittivity k of the dielectric are shown in the equation below:

$$C = \frac{2\pi k\varepsilon_0 L}{\ln\left[\frac{b}{a}\right]}$$

Concentric Cylinders $C$ = capacitance
$k$ = relative permittivity of dielectric
$\varepsilon_0$ = vacuum permittivity
$L$ = length
$b$ = outer radius
$a$ = inner radius The length (height) L of the capacitor, the inner radius a and the outer radius b of the two capacitor plates are known. Thus, the current value of the relative permittivity k of the dielectric may be determined from the measured capacitance C. The relative permittivity k of the dielectric allows for calculation of the current proportion of liquid aerosol-forming substrate, foam material, and air between the capacitor plates. As the total volume of the liquid storage portion is known, the remaining amount of liquid aerosol-forming substrate may be determined from the calculated proportion.

For example, the liquid aerosol-forming substrate comprises a 50:50 mix of VG and PG with 2% nicotine and 2% flavorant content. Neglecting the small nicotine and flavorant content and averaging the dielectric constant for VG (k~42) and PG (k~32) gives k~42×0.5+32×0.5=37 for liquid aerosol-forming substrate.

Assuming that the liquid aerosol-forming substrate is soaked in a homogenous polypropylene foam (k~2.2) and that the foam can absorb a mass of liquid equal to 3 times the foam weight. It is further assumed that there is no air in the foam when the foam is full. Averaging gives k~0.25×2.2+0.75×37~28 for a fully saturated foam. When consuming liquid aerosol-forming substrate, the saturation of liquid aerosol-forming substrate in the foam is reduced. In case of a half saturated foam, half of the liquid aerosol-forming substrate is replaced by air (k=1). Averaging gives k~0.25×2.2+0.3×37+0.375×1~5. In case of an empty liquid storage portion, the entire liquid aerosol-forming substrate has been replaced by air. Averaging gives k~0.25×2.2+0.75×1~1.3.

In at least one example embodiment, a cartridge comprises a liquid storage portion filled with liquid aerosol-forming substrate which can be wicked onto a coil positioned in an airflow. Capacitor plates are arranged around the liquid storage portion such that the combination of liquid aerosol-forming substrate and air in the liquid storage portion provides the dielectric for the capacitor. As liquid aerosol-forming substrate is consumed, the proportion of liquid aerosol-forming substrate and air inside the liquid storage portion changes. The capacitance therefore changes. Based on the measured capacitance, the remaining amount of liquid aerosol-forming substrate held in the liquid storage portion may be determined.

In at least one example embodiment, the liquid is free to move within the container and there is no requirement for the liquid level to be perpendicular to the capacitor plates. In these embodiments, the liquid aerosol-forming substrate is not soaked in an absorbent foam material so that there is only the need to consider the liquid aerosol-forming substrate and air dielectrics. The total average dielectric will change as liquid is consumed. Measuring the capacitance should provide a measurement for the total average dielectric and this can be used to determine the amount of liquid aerosol-forming substrate held between the capacitor plates.

The liquid aerosol-forming substrate held in the liquid storage portion will be subject to gravitational and acceleration forces and this may cause a shift in the liquid aerosol-forming substrate to different locations. However, where the entire liquid storage portion is contained within a capacitor, this shift in liquid aerosol-forming substrate may not affect the total average dielectric since the total dielectric composition remains unchanged.

When combining dielectrics, it is assumed that an average dielectric value can be obtained by multiplying the volume fraction of each component by its corresponding dielectric and then summing the determined values.

It is assumed that the liquid aerosol-forming substrate comprises a 50:50 mix of VG and PG with 2% nicotine and 2% flavorant content. Thus, neglecting the small nicotine and flavorant content and averaging the dielectric constant for VG (k~42) and PG (k~32) gives k~42×0.5+32×0.5=37.

Consequently, the dielectric of an entirely full liquid storage portion to at least one example embodiment will have a relative permittivity k~37. When consuming liquid aerosol-forming substrate, the consumed liquid aerosol-forming substrate is replaced by air. In case of a half full liquid storage portion, half of the liquid aerosol-forming substrate is replaced by air (k~1). Averaging gives k~0.5× 1+0.5×37=19. If the entire amount of liquid aerosol-forming substrate has been consumed, all liquid is replaced by air. Thus, k~1.

The relative permittivity may be calculated from a measured capacitance according to the equations of at least one example embodiment.

According to at least one example embodiment, a cartridge comprises an at least partially transparent liquid storage portion where at least one at least partially transparent capacitor plate is provided. The liquid aerosol-forming substrate contained in the liquid storage portion may be visible to the vaper through a window on the outer surface of the liquid storage portion. Transparent electrodes may be made from Indium Tin Oxide (ITO). The capacitor and the liquid storage portion may be arranged according to at least one example embodiment.

At least one example embodiment is related to a method for measuring a capacitance from which the volume of a liquid aerosol-forming substrate held in a liquid storage portion is determinable, the method comprising providing a sensor comprising a capacitor with a first capacitor plate and a second capacitor plate, providing a liquid storage portion that holds the liquid aerosol-forming substrate, arranging the liquid storage portion between the first capacitor plate and the second capacitor plate, wherein the permittivity of the liquid storage portion changes upon a change of the volume of the liquid aerosol-forming substrate held in the liquid storage portion, and measuring the capacitance of the capacitor, wherein the measured capacitance relates to a corresponding permittivity of the liquid aerosol-forming substrate held in the liquid storage portion so that the amount of the volume of the liquid aerosol-forming substrate held in the liquid storage portion is determinable from the measured capacitance.

In at least one example embodiment, the volume of the liquid aerosol-forming substrate held in the liquid storage portion is determined by accessing a look-up table that relates capacitances to corresponding volumes of the liquid aerosol-forming substrate held in the liquid storage portion.

An aerosol-generating system with the cartridge according to at least one example embodiment may further comprise electric circuitry connected to the vaporizer and to an electrical power source, the electric circuitry configured to monitor the electrical resistance of the vaporizer, and to control the supply of power to the vaporizer dependent on the electrical resistance of the vaporizer.

The electric circuitry may comprise a controller with a microprocessor, which may be a programmable microprocessor. The electric circuitry may comprise further electronic components. The electric circuitry may be configured to regulate a supply of power to the vaporizer. Power may be supplied to the vaporizer continuously following activation of the system or may be supplied intermittently, such as on a puff-by-puff basis. The power may be supplied to the vaporizer in the form of pulses of electrical current. In at least one example embodiment, the vaporizer is a heater assembly comprising an arrangement of filaments.

The aerosol-generating system comprises a power supply, typically a battery, within the main body of the housing. As an alternative, the power supply may be another form of charge storage device such as a capacitor. The power supply may require recharging and may have a capacity that allows for the storage of enough energy for one or more vaping experiences; for example, the power supply may have sufficient capacity to allow for the continuous generation of aerosol for a period of around six minutes or for a period that is a multiple of six minutes. In another example embodiment, the power supply may have sufficient capacity to allow for a desired (or, alternatively a predetermined) number of puffs or discrete activations of the heater assembly.

For allowing ambient air to enter the cartridge, a wall of the housing of the cartridge, a wall opposite the vaporizer, such as a bottom wall, is provided with at least one semi-open inlet. The semi-open inlet allows air to enter the cartridge, but no air or liquid to leave the cartridge through the semi-open inlet. A semi-open inlet may for example be a semi-permeable membrane, permeable in one direction only for air, but is air- and liquid-tight in the opposite direction. A semi-open inlet may for example also be a one-way valve. In at least one example embodiment, the semi-open inlets allow air to pass through the inlet only if specific conditions are met, for example a minimum or desired depression in the cartridge or a volume of air passing through the valve or membrane.

The aerosol-forming substrate is a substrate capable of releasing volatile compounds that can form an aerosol. The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. The aerosol-forming substrate may comprise other additives and ingredients, such as flavorants.

The aerosol-generating system may comprise a main unit and the cartridge that is removably coupled to the main unit. The liquid storage portion and the vaporizer are provided in the cartridge and the main unit comprises a power supply, a controller, and a memory. The controller and the memory are powered by the power supply. The controller is connected to the sensor and configured to measure the capacitance of the capacitor of the sensor and to store data indicative of the measured capacitance or the determined volume of the liquid storage portion in the memory. At least one component of the sensor is located in the cartridge, while remaining components of the sensor, if any, are located in the main unit.

The aerosol-generating system may be an electrically operated vaping system. In at least one example embodiment, the aerosol-generating system is portable. The aerosol-generating system may have a size comparable to a cigar or cigarette. The vaping system may have a total length ranging from about 30 millimeters to about 150 millimeters. The vaping system may have an external diameter ranging from about 5 millimeters to about 30 millimeters.

Features described in relation to one embodiment may equally be applied to other embodiments.

BRIEF DESCRIPTION OF DRAWINGS

Embodiments will now be described, by way of example only, with reference to the accompanying drawings, in which.

DETAILED DESCRIPTION

Figure 1:
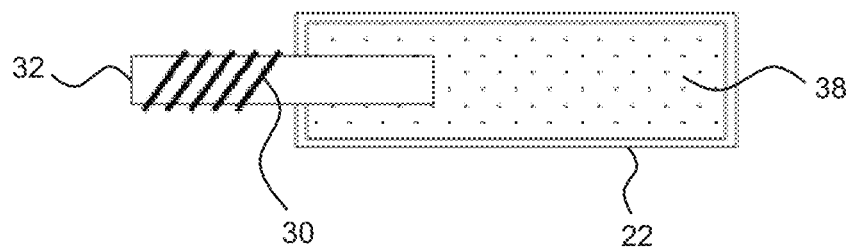
FIG. 1 is a topside view of a conventional aerosol-generating system comprising a liquid storage portion, a capillary medium, and a vaporizer.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that: extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

FIG. 1 shows a conventional cartridge comprising a rigid liquid storage portion 22 with a wick 32 and heating coil 30 wound around the wick 32. The liquid storage portion 22 provides an internal volume 38 in which the liquid aerosol-forming substrate is contained.

Figure 2A:
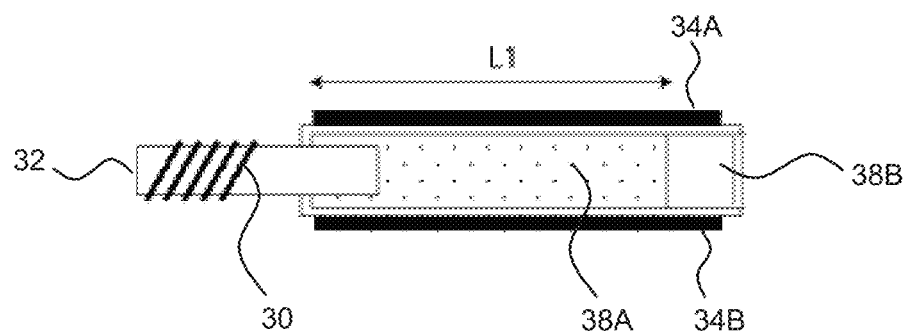
FIG. 2A is a topside view of an aerosol-generating system comprising a liquid storage portion, a sensor comprising a parallel plate capacitor, a capillary medium, and a vaporizer, in accordance with at least one example embodiment.
Figure 2B:
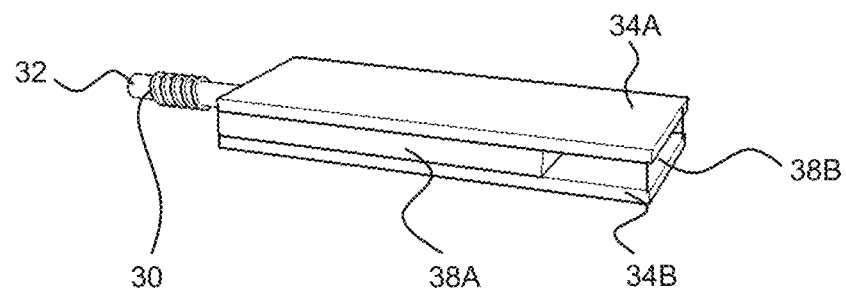
FIG. 2B is a perspective view of the aerosol-generating system of FIG. 2A.

FIGS. 2A and 2B show a cartridge according to at least one example embodiment. The cartridge comprises a rigid liquid storage portion with an internal volume sufficiently narrow that capillary forces act on the liquid aerosol-forming substrate in the liquid section 38A of the internal volume. Two capacitor plates 34A, 34B are arranged around the liquid storage portion. Liquid aerosol-forming substrate is drawn to the wick 32 end as the liquid aerosol-forming substrate is consumed. The liquid aerosol-forming substrate does not move around freely in the liquid storage portion so that an air section 38B increases upon consumption of the liquid aerosol-forming substrate. In this way, the dielectric is reduced and therefore capacitance is also reduced. In FIGS. 2A and 2B the effective length of the capacitor corresponding to the liquid section 38A is L1.

Figure 3A:
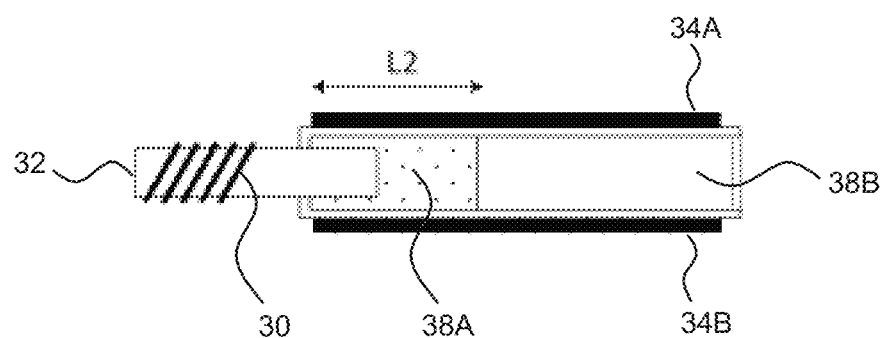
FIG. 3A is a topside view of the aerosol-generating system of FIG. 2A where the volume of liquid aerosol-forming substrate held in the liquid storage portion has been decreased.
Figure 3B:
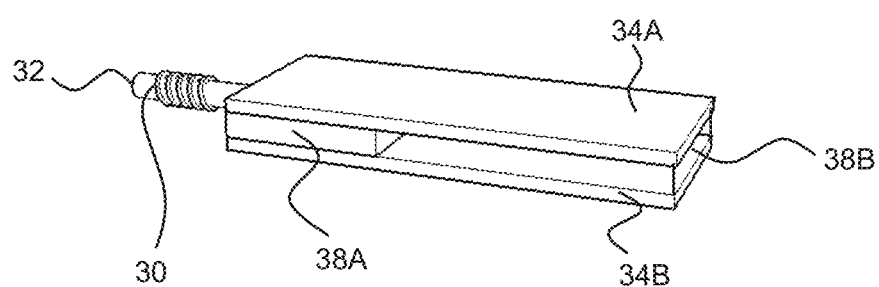
FIG. 3B is a perspective view of the aerosol-generating system of FIG. 3A.

In FIGS. 3A and 3B, after consumption, the effective length of the capacitor corresponding to the liquid section 38A is L2.

Figure 4A:
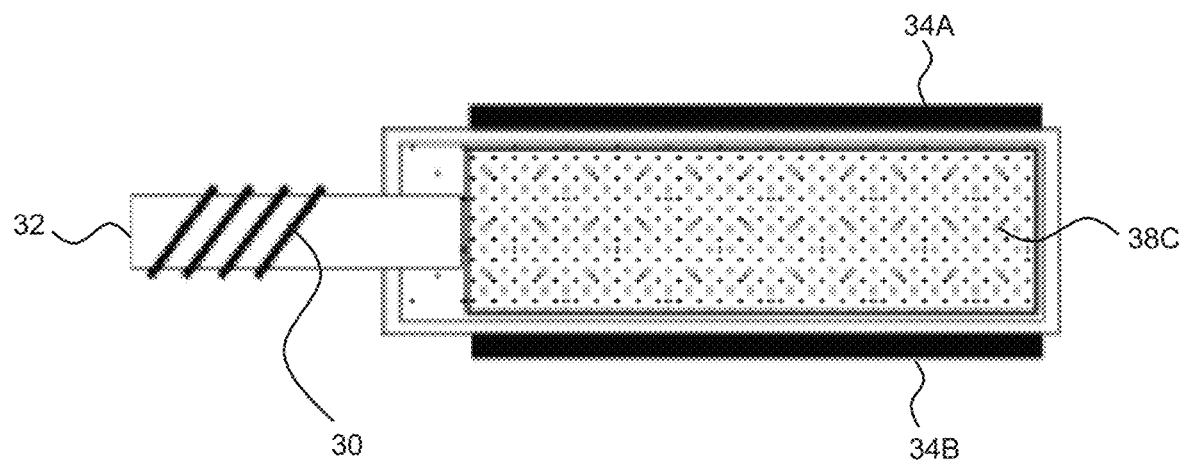
FIG. 4A is a topside view of an aerosol-generating system comprising a liquid storage portion, a sensor comprising a parallel plate capacitor, a capillary medium, and a vaporizer, in accordance with at least one example embodiment.

FIG. 4A shows a cartridge according to at least one example embodiment. The cartridge comprises a rigid liquid storage portion with a foam soaked in liquid aerosol-forming substrate located in the internal volume 38C of the liquid storage portion. Capacitor plates 34A, 34B are provided on opposing surfaces of the liquid storage portion and the liquid aerosol-forming substrate soaked foam acts a dielectric. In FIG. 4A the foam has a first saturation.

Figure 4B:
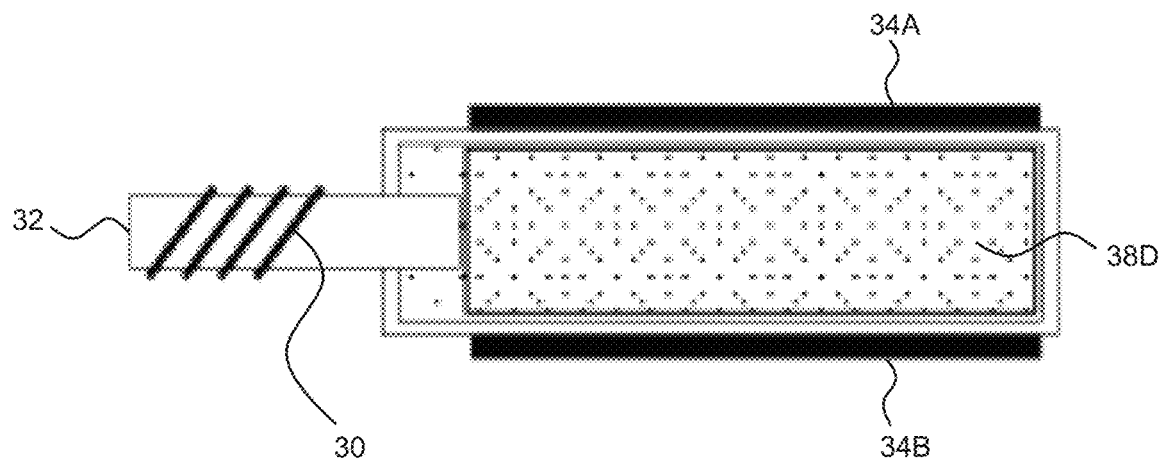
FIG. 4B is a topside view of the aerosol-generating system of FIG. 4A where the volume of liquid aerosol-forming substrate held in the liquid storage portion has been decreased.

FIG. 4B shows the cartridge of FIG. 4A after consuming a part of the liquid aerosol-forming substrate. Due to the consumption, the saturation of the liquid aerosol-forming substrate in the foam decreases. The internal volume 38D has the same size as internal volume 38C, but showing a different saturation of the contained liquid aerosol-forming substrate. The saturation change causes a change of the dielectric properties which in turn changes the measured capacitance of the capacitor.

Figure 5A:
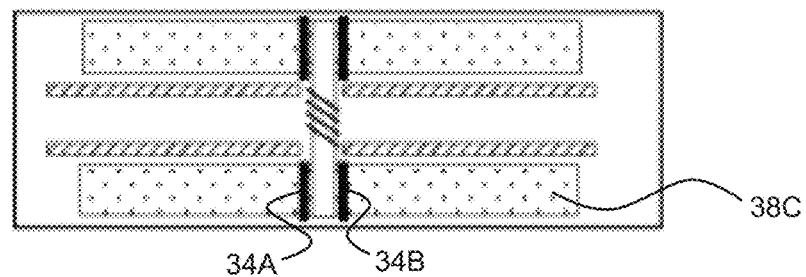
FIG. 5A is a topside view of an aerosol-generating system comprising a liquid storage portion, a sensor comprising a parallel plate capacitor, a capillary medium, and a vaporizer, in accordance with at least on example embodiment.
Figure 5B:
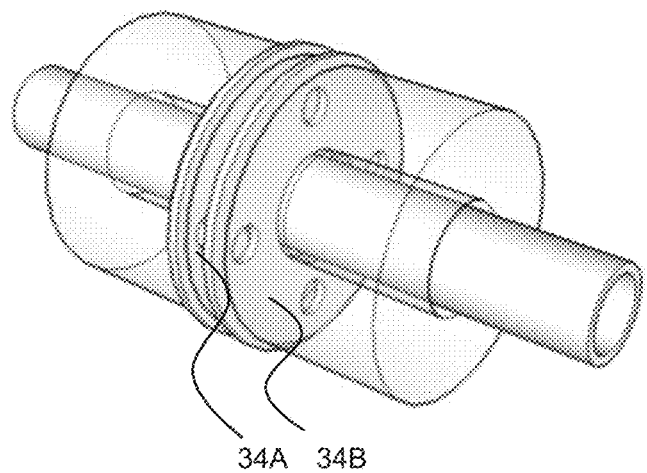
FIG. 5B is a perspective view of the aerosol-generating system of FIG. 5A with a circular parallel plate capacitor.
Figure 5C:
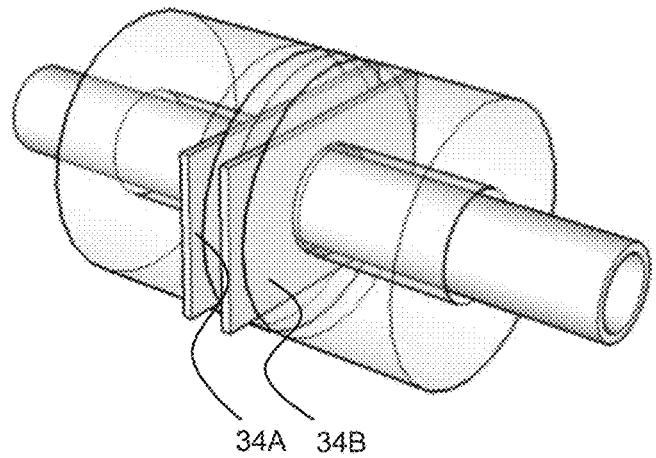
FIG. 5C is a perspective view of the aerosol-generating system of FIG. 5A with a rectangular parallel plate capacitor.

FIGS. 5A and 5B show a cartridge according to at least one example embodiment providing a cartomizer disposable section with a wick/foam element and a coil perpendicular to airflow. The wick/foam element is provided between capacitor plates 34A, 34B. The liquid aerosol-forming substrate soaked wick acts as a dielectric for the capacitor. As the liquid is consumed the saturation of the wick decreases and the dielectric properties and capacitance changes. The capacitance gives an indication of the liquid aerosol-forming substrate remaining in the internal volume 38C of the liquid storage portion. While FIG. 5B shows planar capacitor plates 34A, 34B of circular shape, FIG. 5C shows an alternative configuration with planar capacitor plates 34A, 34B of rectangular shape.

Figure 6A:
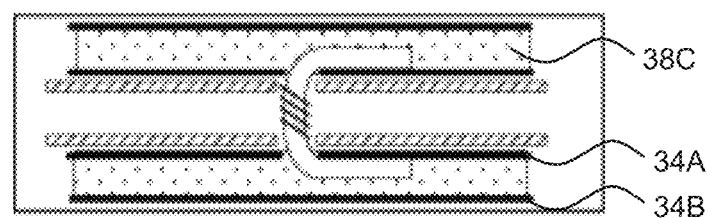
FIG. 6A is a topside view of an aerosol-generating system comprising a liquid storage portion, a sensor comprising a concentric cylinder capacitor, a capillary medium, and a vaporizer, in accordance with at least one example embodiment.
Figure 6B:
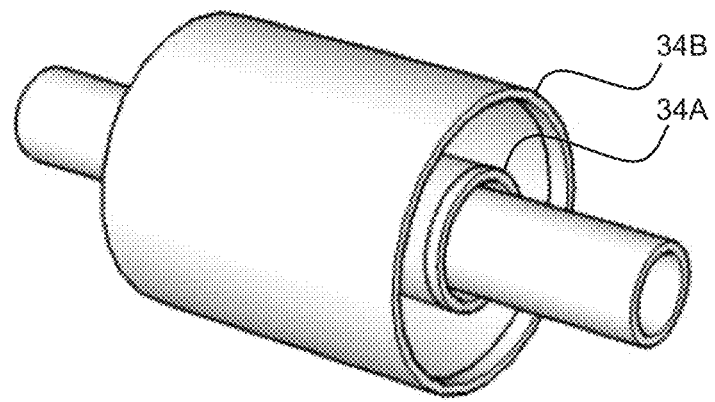
FIG. 6B is a perspective view of the aerosol-generating system of FIG. 6A.

FIGS. 6A and 6B show a cartridge according to at least one example embodiment. A capacitor is formed by concentric capacitor plates 34A, 34B along the length of the cartomizer.

Figure 7A:
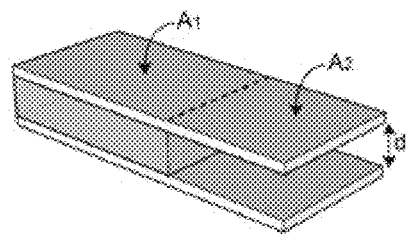
FIG. 7A is a perspective view of a parallel plate capacitor with a liquid level being essentially perpendicular to the capacitor plates, in accordance with at: least one example embodiment.

FIG. 7A shows a cartridge according to at least one example embodiment with to two planar, essentially parallel capacitor plates. The capacitor plates may have a length of about 25 to about 30 millimeters and a width of about 5 to about 7 millimeters. The total area size of each of the two capacitor plates may be in a range of 25×5 square millimeters to 30×7 square millimeters. The total area is split between a first capacitor indicated with area $A_1$ for the liquid section of the liquid storage portion and a second capacitor indicated with area $A_2$ for the air section of the liquid storage portion. The separation d between the two capacitor plates is sufficiently small that the liquid aerosol-forming substrate is held by capillary forces. The separation d may be between 2 and 3 millimeters. Alternatively, two parallel plate capacitors are provided with an airflow channel between. Assuming area values similar to the cartridge shown in FIG. 7A, but with a smaller plate separation, gives a total area size for each capacitor of about 125 to about 210 square millimeters and a separation d of about 1.5 to about 2 millimeters.

Figure 7B:
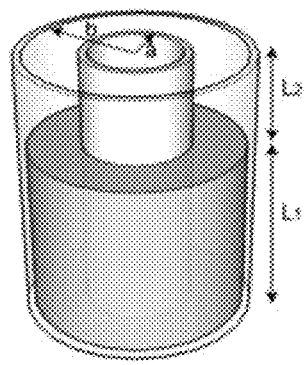
FIG. 7B is a perspective view of a concentric cylinder capacitor with a liquid level being essentially perpendicular to the capacitor plates, in accordance with at least one example embodiment.

FIG. 7B shows a cartridge according to at least one example embodiment providing a cylindrical capacitor with free flowing liquid that need not to be restricted by capillary forces. An accurate reading may be obtained when the cartridge is orientated vertically. In order to achieve this, a tilt sensor may be provided and a vaper may be instructed to align the device vertically in order to obtain a reading. The vertical alignment: may be communicated to the vaper by a light, a display or a sound. Once vertical, the cartridge can measure the capacitance. The airflow channel diameter may be about 2 to about 3 millimeters. The capacitor may have a total length (height) of about 25 to about 40 millimeters, an inner radius a of about 1.5 to about 2 millimeters and an outer radius b of about 4 to about 6 millimeters.

Figure 7C:
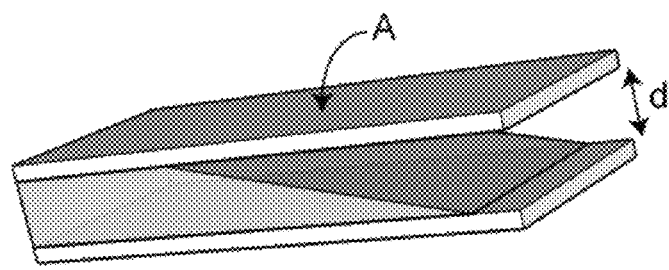
FIG. 7C is a perspective view of a parallel plate capacitor with a liquid free to move between the capacitor plates, in accordance with at least one example embodiment.

FIG. 7C shows a cartridge according to at least one example embodiment providing a parallel plate capacitor arranged around a rectangular liquid storage portion. The liquid aerosol-forming substrate held in the liquid storage portion may freely move. The capacitor plates may have a length of about 25 to about 30 millimeters and a width of about 5 to about 7 millimeters. The total area size of each of the two capacitor plates may be in a range of about 25×5 square millimeters to about 30×7 square millimeters. The separation d may be between about 5 and about 7 millimeters.

Figure 7D:
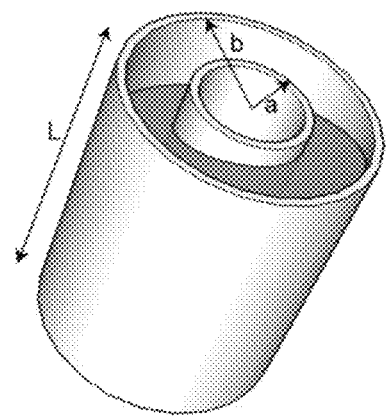
FIG. 7D is a perspective view of a concentric cylinder capacitor with a liquid free to move between the capacitor plates, in accordance with at least one example embodiment.

FIG. 7D shows a cartridge according to at least one example embodiment providing a cylindrical capacitor with free flowing liquid that need not to be restricted by capillary forces. The liquid aerosol-for substrate held in the liquid storage portion may freely move. In this embodiment, accurate reading does not require a vertically oriented cartridge. The current amount of liquid is calculated from the determined relative permittivity of the dielectric. The airflow channel diameter may be about 2 to about 3 millimeters. The capacitor may have a total length (height) of about 25 to about 40 millimeters, an inner radius a of about 1.5 to about 2 millimeters and an outer radius b of about 4 to about 6 millimeters.

Figure 8A:
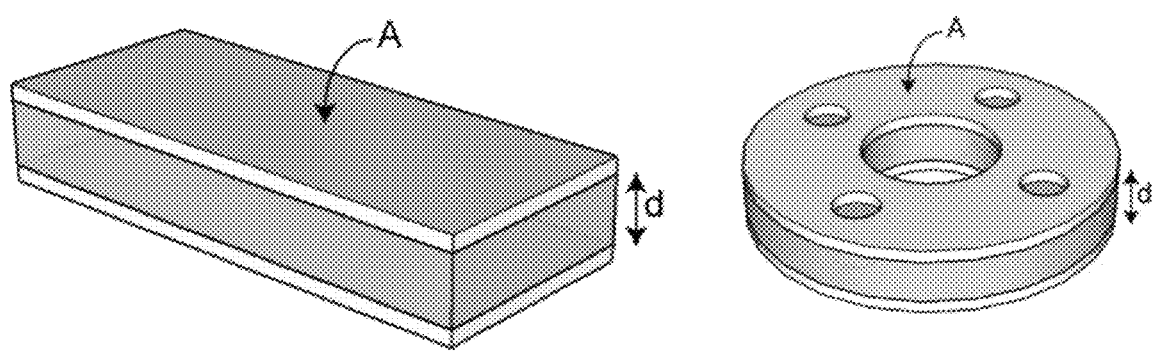
FIG. 8A is a perspective view of a rectangular and a circular parallel plate capacitor where the liquid is soaked in a capillary medium, in accordance with at least one example embodiment.

FIG. 8A shows a cartridge according to at least one example embodiment with a rectangular liquid storage portion and a parallel plate capacitor. Alternatively, a cylindrical liquid storage portion may be arranged between the parallel plate capacitor. Assuming a length of about 25 to about 30 millimeters and a width of about 5 to about 7 millimeters for each capacitor plate, gives a total area range of about 25×5 square millimeters to about 30×7 square millimeters and a separation d of about 5 to about 7 millimeters.

Figure 8B:
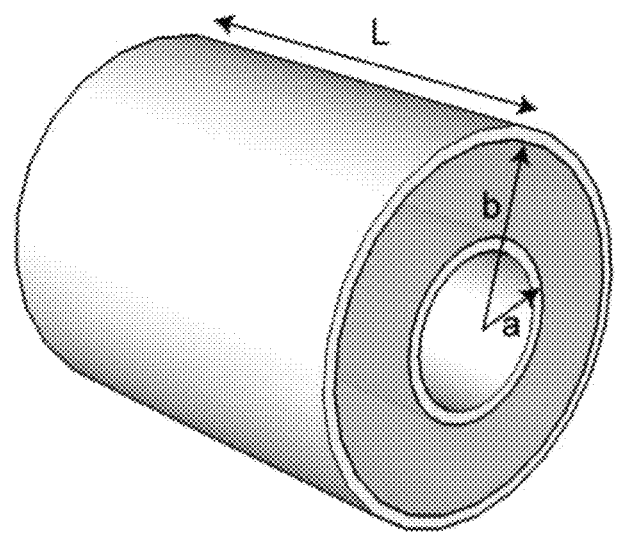
FIG. 8B is a perspective view of a concentric cylinder capacitor where the liquid is soaked in a capillary medium, in accordance with at least one example embodiment.

FIG. 8B shows a cartridge according to at least one example embodiment with a cylindrical saturated foam wrapped around a central airflow channel. The airflow channel diameter may be about 2 to about 3 millimeters. The capacitor may have a total length (height) of about 25 to about 40 millimeters, an inner radius a of about 1.5 to about 2 millimeters and an outer radius b of about 4 to about 6 millimeters.

Figure 9:
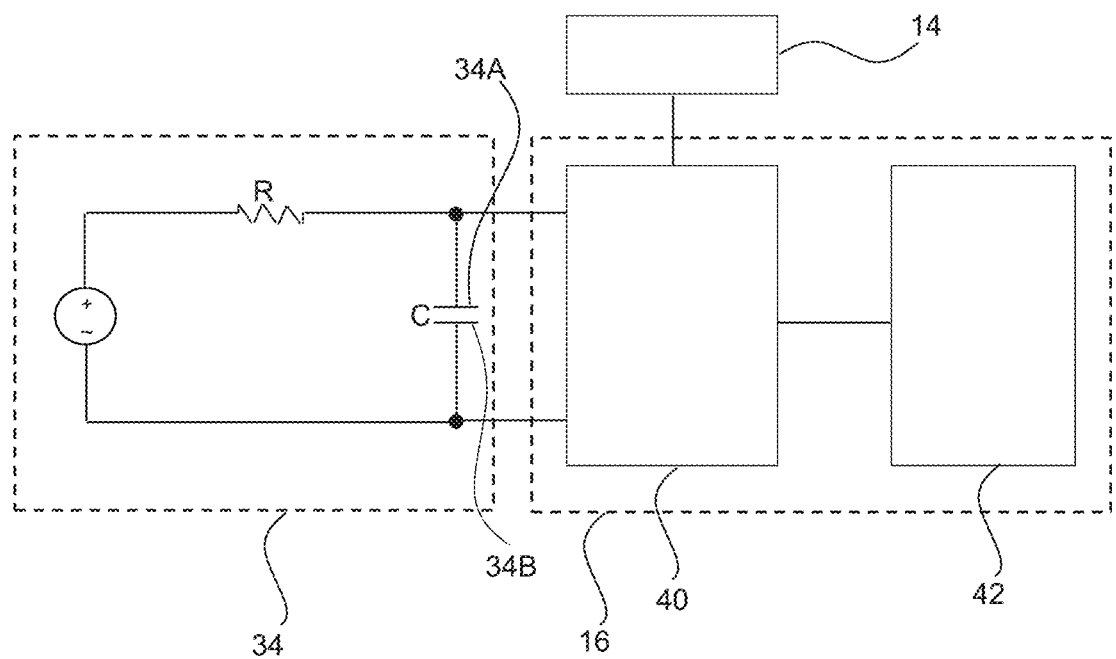
FIG. 9 is a schematic illustration of the electrical configuration of a sensor.

FIG. 9 the electrical configuration of a sensor 34 according to some example embodiments. The sensor 34 comprises at least one capacitor with two capacitor plates 34A, 34B onto which an alternating voltage is applied. The resulting voltage is measured by control electronics 16 after an analog-to-digital (ADC) conversion. The control electronics 16 comprises a controller 40 and memory 42 for retrieving calculation parameters and for storing the results of volume calculations. The control electronics 16 is connected to a power supply 14. The controller 40 is configured to execute volume determination based on the previously described embodiments and calculations described herein.

Figure 10:
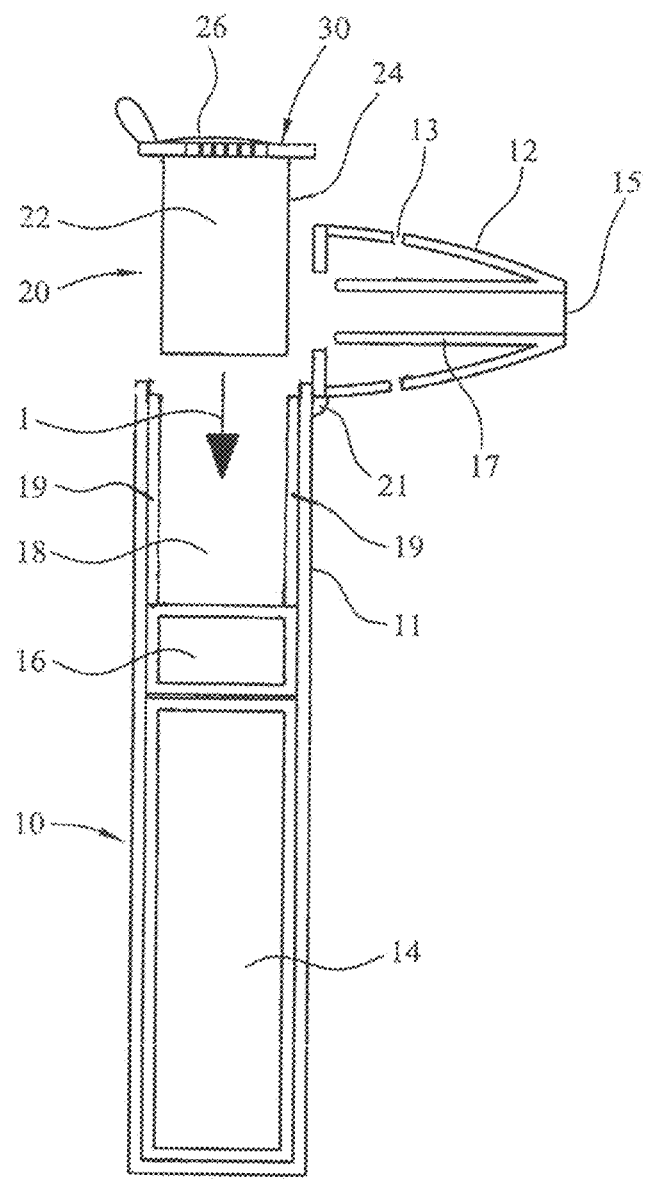
FIG. 10 is a schematic illustration of an aerosol-generating system, incorporating a liquid storage portion, a sensor with a capacitor, a capillary medium, and a vaporizer in accordance with at least one example embodiment.

FIG. 10 is a schematic illustration of an aerosol-generating system. The aerosol-generating system comprises an aerosol-generating device 10 and a separate cartridge 20. The cartridge 20 comprises a liquid storage portion 22 configured to hold a liquid aerosol-forming substrate. The cartridge 20 further comprises a vaporizer 30 configured to receive liquid aerosol-forming substrate that is drawn via a capillary medium 32 from the liquid storage portion 22. Furthermore, the cartridge 20 comprises at least one component of the sensor 34, while remaining components of the sensor 34, if there are any, may be arranged in the aerosol-generating device 10. In this example, the aerosol-generating system is an electrically operated vaping system.

The cartridge 20 is configured to be received in a cavity 18 within the device. Cartridge 20 should be replaceable by a vaper when the aerosol-forming substrate provided in the cartridge 20 is depleted. FIG. 10 shows the cartridge 20 just prior to insertion into the device, with the arrow 1 in FIG. 10 indicating the direction of insertion of the cartridge 20. The vaporizer 30 and the capillary medium 32 is located in the cartridge 20 behind a cover 26. The aerosol-generating device 10 is portable and has a size comparable to a conventional cigar or cigarette. The device 10 comprises a main body 11 and a mouthpiece portion 12. The main body 11 contains a power supply 14, for example a battery such as a lithium iron phosphate battery, control electronics 16 and a cavity 18. The mouthpiece portion 12 is connected to the main body 11 by a hinged connection 21 and can move between an open position as shown in FIG. 10 and a closed position. The mouthpiece portion 12 is placed in the open position to allow for insertion and removal of cartridges 20 and is placed in the closed position when the system is to be used to generate aerosol. The mouthpiece portion comprises a plurality of air inlets 13 and an outlet 15. In use, a vaper draws or puffs on the outlet to draw air from the air inlets 13, through the mouthpiece portion to the outlet 15, and thereafter into the mouth or lungs of the vaper. Internal baffles 17 are provided to force the air flowing through the mouthpiece portion 12 past the cartridge.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

Other cartridge designs incorporating at least one component of the sensor 34, a vaporizer 30 and a capillary medium 32 can now be conceived by one of ordinary skill in the art. For example, the cartridge 20 may include a mouthpiece portion 12, may include more than one vaporizer and may have any desired shape.

The exemplary embodiments described above illustrate but are not limiting. In view of the above discussed exemplary embodiments, other embodiments consistent with the above exemplary embodiments will now be apparent to one of ordinary skill in the art.

We claim:

1. A cartridge for an aerosol-generating system, the cartridge comprising:
 a sensor including,
  a capacitor, the capacitor including,
   a first capacitor plate, and
   a second capacitor plate;

a storage portion configured to store an aerosol-forming substrate, a permittivity of the storage portion configured to change upon a change of a volume of the aerosol-forming substrate held in the storage portion, the storage portion defining a central air passage, the central air passage extending perpendicular to the first capacitor plate and the second capacitor plate;

a wick in communication with the storage portion and extending perpendicular to the central air passage, such that at least a portion of the wick is between the first capacitor plate and the second capacitor plate;

a vaporizer in the central air passage and surrounding at least a portion of the wick, the sensor configured to measure a capacitance of the capacitor, the measured capacitance relating to a corresponding permittivity of the aerosol-forming substrate held in the storage portion; and a controller configured to, based on the measured capacitance, calculate a remaining amount of the aerosol-forming substrate.

2. The cartridge according to claim 1, wherein the storage portion comprises:
one or more flexible walls configured to adapt to the volume of the aerosol-forming substrate stored in the storage portion.

3. The cartridge according to claim 1, wherein the storage portion comprises:
a capillary medium configured to store the aerosol-forming substrate.

4. The cartridge according to claim 1, wherein the storage portion comprises:
a first wall; and
a second wall,
wherein the first capacitor plate is arranged at the first wall and the second capacitor plate is arranged at the second wall.

5. The cartridge according to claim 4, wherein the first wall and the second wall have a generally cylindrical shape, and wherein the second wall is located within a volume defined by the first wall.

6. The cartridge according to claim 5, wherein the first capacitor plate and the second capacitor plate have a generally cylindrical shape.

7. The cartridge according to claim 1, wherein:
the controller is configured to determine a volume of the storage portion dependent on an output of the sensor.

8. The cartridge according to claim 1, wherein a distance between the first capacitor plate and the second capacitor plate remains unchanged.

9. The cartridge according to claim 1, wherein the aerosol-forming substrate is configured to be drawn to an end of the storage portion.

10. The cartridge according to claim 1, wherein the first capacitor plate and the second capacitor plate comprise a circular shape.

11. The cartridge according to claim 1, wherein the first capacitor plate and the second capacitor plate comprise a rectangular shape.

12. An aerosol-generating system comprising:
a main unit including,
a power supply; and
a cartridge removably coupled to the main unit, the cartridge including,
a sensor including,
a capacitor, the capacitor including,
a first capacitor plate, and
a second capacitor plate,
a storage portion configured to store an aerosol-forming substrate, a permittivity of the storage portion configured to change upon a change of a volume of the aerosol-forming substrate held in the storage portion, the storage portion defining a central air passage, the central air passage extending perpendicular to the first capacitor plate and the second capacitor plate,
a wick in communication with the storage portion and extending perpendicular to the central air passage, such that at least a portion of the wick is between the first capacitor plate and the second capacitor plate,
a vaporizer in the central air passage and surrounding at least a portion of the wick, the sensor configured to measure a capacitance of the capacitor, the measured capacitance relating to a corresponding permittivity of the aerosol-forming substrate held in the storage portion,
a controller configured to, based on the measured capacitance, calculate a remaining amount of the aerosol-forming substrate, and
a memory, the capacitor, the controller, and the memory each included in one of the main unit and the cartridge.

13. A method of measuring a capacitance from which a volume of an aerosol-forming substrate held in a storage portion is determinable, the method comprising:
providing a sensor including a capacitor with a first capacitor plate and a second capacitor plate;
providing the storage portion that stores the aerosol-forming substrate, a permittivity of the storage portion changes upon a change of a volume of the aerosol-forming substrate held in the storage portion, the storage portion defining a central air passage, the central air passage extending perpendicular to the first capacitor plate and the second capacitor plate;
providing a wick in communication with the storage portion and extending perpendicular to the central air passage, such that at least a portion of the wick is between the first capacitor plate and the second capacitor plate;
providing a vaporizer in the central air passage and surrounding at least a portion of the wick;
measuring the capacitance of the capacitor, the measured capacitance relating to a corresponding permittivity of the aerosol-forming substrate held in the storage portion; and
determining, based on the measured capacitance, a remaining amount of the aerosol-forming substrate.

14. The method according to claim 13, further comprising:
determining the volume of the aerosol-forming substrate held in the storage portion by accessing a look-up table that relates capacitances to corresponding volumes of the aerosol-forming substrate held in the storage portion.

* * * * *